US010394478B2

(12) United States Patent
Li et al.

(10) Patent No.: US 10,394,478 B2
(45) Date of Patent: Aug. 27, 2019

(54) METHOD AND APPARATUS FOR STORAGE DEVICE ALLOCATION

(71) Applicant: EMC IP Holding Company LLC, Hopkinton, MA (US)

(72) Inventors: Wayne Weihua Li, Beijing (CN); Geng Han, Beijing (CN); Jian Gao, Beijing (CN); Jibing Dong, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/846,330

(22) Filed: Dec. 19, 2017

(65) Prior Publication Data

US 2018/0173445 A1 Jun. 21, 2018

(30) Foreign Application Priority Data

Dec. 21, 2016 (CN) .......................... 2016 1 1192933

(51) Int. Cl.
*G06F 3/06* (2006.01)

(52) U.S. Cl.
CPC .......... *G06F 3/0631* (2013.01); *G06F 3/0604* (2013.01); *G06F 3/064* (2013.01); *G06F 3/0665* (2013.01); *G06F 3/0683* (2013.01)

(58) Field of Classification Search
CPC ...... G06F 3/0604; G06F 3/0631; G06F 3/064; G06F 3/0665; G06F 3/0683
See application file for complete search history.

(56) References Cited

U.S. PATENT DOCUMENTS

| | | | | |
|---|---|---|---|---|
| 6,061,732 A * | 5/2000 | Korst | G06F 3/0611 348/E5.008 |
| 6,370,616 B1 * | 4/2002 | Callison | G06F 11/1076 711/114 |
| 7,346,831 B1 * | 3/2008 | Corbett | G06F 11/1076 714/5.11 |
| 7,499,834 B1 | 3/2009 | Shivnath et al. | |
| 8,046,560 B1 | 10/2011 | Voorhees | |

(Continued)

OTHER PUBLICATIONS

Alvarez et al., Guillermo,. Tolerating multiple failures in RAID architectures with optimal storage and uniform declustering. Proceeding of the 24th annual international symposium on Computer architecture (Year: 1997).*

(Continued)

*Primary Examiner* — Larry T Mackall
(74) *Attorney, Agent, or Firm* — BainwoodHuang

(57) ABSTRACT

Embodiments of the present disclosure provide a method and device for storage management. For example, there is proposed a method comprising: in response to a plurality of storage devices in a storage system being to be allocated to an unallocated logic storage area, determining a plurality of allocation schemes for allocating the plurality of storage devices to the unallocated logic storage area; obtaining allocation uniformity of the plurality of storage devices with respect to an allocated logic storage area of the storage system; and selecting one of the plurality of allocation schemes at least based on the allocation uniformity, such that the uniform degree of the allocation has a minimum variation. Corresponding device and computer program product are also disclosed.

9 Claims, 9 Drawing Sheets

(56) References Cited

U.S. PATENT DOCUMENTS

| | | | |
|---|---|---|---|
| 8,762,662 | B1 | 6/2014 | Blitzer et al. |
| 8,856,481 | B1 | 10/2014 | Palekar |
| 9,772,792 | B1 | 9/2017 | Wallner et al. |
| 9,805,044 | B1 | 10/2017 | Armangau et al. |

OTHER PUBLICATIONS

Holland et al., Mark. Parity Declustering for Continuous Operation in Redundant Disk Arrays. Proceeding of the 5th Conference on Architectural Support for Programming Languages and Operating Systems (Year: 1992).*

* cited by examiner

810B

820B

830B

810C

820C

830C

METHOD AND APPARATUS FOR STORAGE DEVICE ALLOCATION

RELATED APPLICATIONS

This application claim priority from Chinese Patent Application Number CN201611192933.0, filed on Dec. 21, 2016 at the State Intellectual Property Office, China, titled "METHOD AND APPARATUS FOR STORAGE MANAGEMENT" the contents of which is herein incorporated by reference in its entirety.

FIELD

Embodiments of the present disclosure generally relate to storage management, and more specifically, to a method and device for storage management.

BACKGROUND

Redundant array of independent disks (RAID) is a data storage virtualization technology, which combines a plurality of physical disk drives into a single logic unit to improve data redundancy, reliability and performance. Depend on the required level of redundancy and performance, data is distributed across the plurality of physical disk drives using one of a plurality of RAID levels, for example, which can be RAID 0-RAID 50 etc. For example, in the conventional RAID 5, RAID 5 consists of block-level striping with distributed parity. The parity information is distributed among the plurality physical disk drives. Upon failure of a single physical disk drive, data read subsequently can be calculated (for example, via Exclusive OR (XOR) operation) from the distributed parity, such that no data is lost. Meanwhile, a hot spare physical disk drive can be selected to replace a damaged physical disk drive. All data on the damaged physical disk drive is rebuilt and written into the selected hot spare physical disk drive.

However, with the emergence of new technologies (for example, shingled media disk), the disk capacity increases, and the rebuilding time increases accordingly. In this case, the risk of double disk failure increases if the rebuilding time is not reduced. When the conventional RAID technology such as RAID 5 is employed, double disk failure will cause data loss. The rebuilding time is limited by the write input/output bandwidth of the hot spare physical disk drive. Therefore, the write input/output bandwidth of the hot spare physical disk drive has become the bottleneck for the conventional RAID technology, and the conventional RAID technology can hardly reduce the rebuilding time.

SUMMARY

Embodiments of the present disclosure provide a method and device for storage management and a corresponding computer program product.

In one aspect of the present disclosure, there is provided a method for storage management. The method comprises: in response to a plurality of storage devices in a storage system being to be allocated to an unallocated logic storage area, determining a plurality of allocation schemes for allocating the plurality of storage devices to the unallocated logic storage area; obtaining allocation uniformity of the plurality of storage devices with respect to an allocated logic storage area of the storage system; and selecting one of the plurality of allocation schemes at least based on the allocation uniformity, such that the uniform degree of the allocation has a minimum variation.

In some embodiments, the unallocated logic storage area is organized into a predetermined number of blocks, and the determining a plurality of allocation schemes comprises: generating, based on the predetermined number and the number of the plurality of storage devices, a plurality of candidate allocation schemes for allocating the plurality of storage devices to the unallocated logic storage area; and determining, as the plurality of allocation schemes, a subset of the plurality of candidate allocation schemes covering the plurality of storage devices.

In some embodiments, selecting one of the plurality of allocation schemes comprises: obtaining allocation status of the plurality of storage devices with respect to the allocated logic storage area and sizes of the plurality of storage devices; generating, based on the allocation status and the plurality of allocation schemes, allocation status candidates of the plurality of storage devices with respect to the allocated logic storage area and the unallocated logic storage area of the storage system; determining, based on the allocation status candidates and the sizes of the plurality of storage devices, allocation uniformity candidates of the plurality of storage devices with respect to the allocated logic storage area and the unallocated logic storage area of the storage system; selecting, from the plurality of allocation schemes, an allocation scheme corresponding to one of the allocation uniformity candidates that has a minimum difference from the allocation uniformity.

In some embodiments, the allocation status is represented as a matrix, each element in the matrix represents the number of times for allocating blocks in two of the plurality of storage devices to the same allocated logic storage area.

In some embodiments, the allocation uniformity is determined as: $U_{i,j}=V_{i,j}*S_{typical}*S_{typical}\ (S_i*S_j)$, where $U_{i,j}$ represents the allocation uniformity, $V_{i,j}$ represents the allocation status, $S_{typical}$ represents a predetermined size of a storage device, $S_i$ and $S_j$ represent sizes of an i-th storage device and a j-th storage device in the plurality of storage devices, respectively, i and j are natural numbers, respectively.

In the second aspect of the present disclosure, there is provided an electronic device. The device comprises: at least one processing unit, and at least one memory coupled to the at least one processing unit and storing machine-executable instructions, the instructions, when executed by the at least one processing unit, cause the device to perform actions comprising: in response to a plurality of storage devices in a storage system being to be allocated to an unallocated logic storage area, determining a plurality of allocation schemes for allocating the plurality of storage devices to the unallocated logic storage area; obtaining allocation uniformity of the plurality of storage devices with respect to an allocated logic storage area of the storage system; and selecting one of the plurality of allocation schemes at least based on the allocation uniformity, such that the uniform degree of the allocation has a minimum variation.

The Summary is provided to introduce the selections of concepts in s simplified way, which will be further explained in the following detailed descriptions of the embodiments. The Summary does not intend to identify key or essential features of the present disclosure or to limit the scope of the present disclosure.

BRIEF DESCRIPTION OF THE DRAWINGS

Through the more detailed description of example embodiments of the present disclosure with reference to the accompanying drawings, the above and other objectives, features, and advantages of the present disclosure will become more apparent, in which same reference signs in the example embodiments of the present disclosure usually represent same components.

DETAILED DESCRIPTION OF EMBODIMENTS

The preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same of different objects. The following text can comprise other explicit and implicit definitions.

Figure 1:
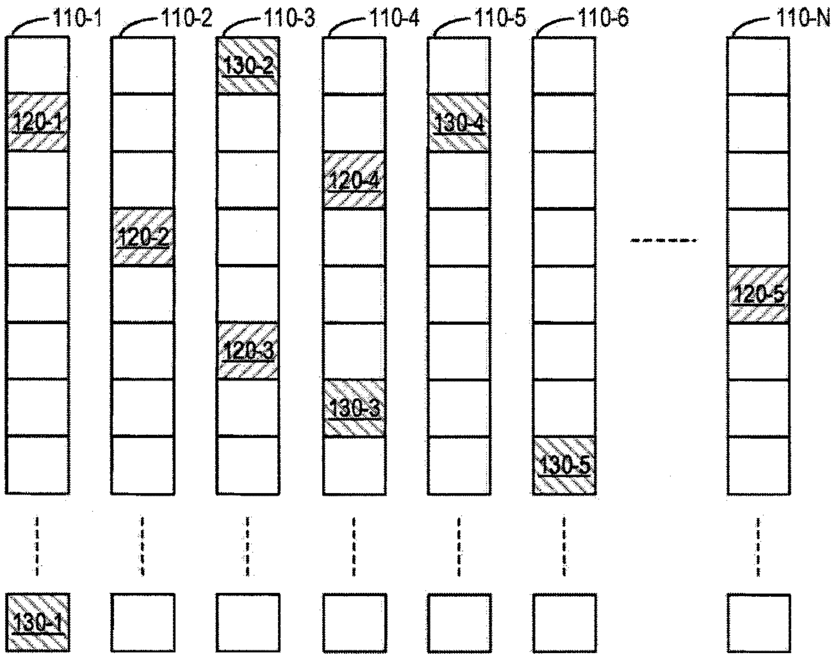
FIG. 1 is a schematic diagram of an example of creating logic storage areas on a plurality of storage devices in a storage system.

FIG. 1 illustrates a schematic diagram of an example of creating logic storage areas on a plurality of storage devices in the storage system. The storage system can reduce rebuilding time using mapped RAID, which can be created on a storage device pool consisting of a plurality of storage devices. The storage device can be regarded as a series of continuous and non-overlapping storage regions, which usually have a fixed size or capacity. Examples of the storage device comprise but not limited to physical disk drives. Hereinafter, 4D+1P RAID 5 is taken as an example to describe an example of creating logic storage areas on a plurality of storage devices in the mapped RAID.

FIG. 1 shows N storage devices 110-1 to 110-N (collectively referred to as storage device 110 hereinafter), where N is a natural number greater than five. The logic storage area can be created on N storage devices and organized into five blocks, including four data blocks and one parity block. Five blocks in five different storage devices can be selected from N storage devices 110 to create a logic storage area. FIG. 1 shows logic storage areas 120 and 130. The logic storage area 120 is organized into blocks 120-1 to 120-5, where the blocks 120-1 to 120-4 are data blocks and the block 120-5 is a parity block. The logic storage area 130 is organized into blocks 130-1 to 130-5, where the blocks 130-1 to 130-4 are data blocks and the block 130-5 is a parity block. Additionally, different from reserving the entire storage device as the hot spare storage device in the conventional RAID technology, the mapped RAID reserves the block in the storage device as a hot spare block.

Figure 2:
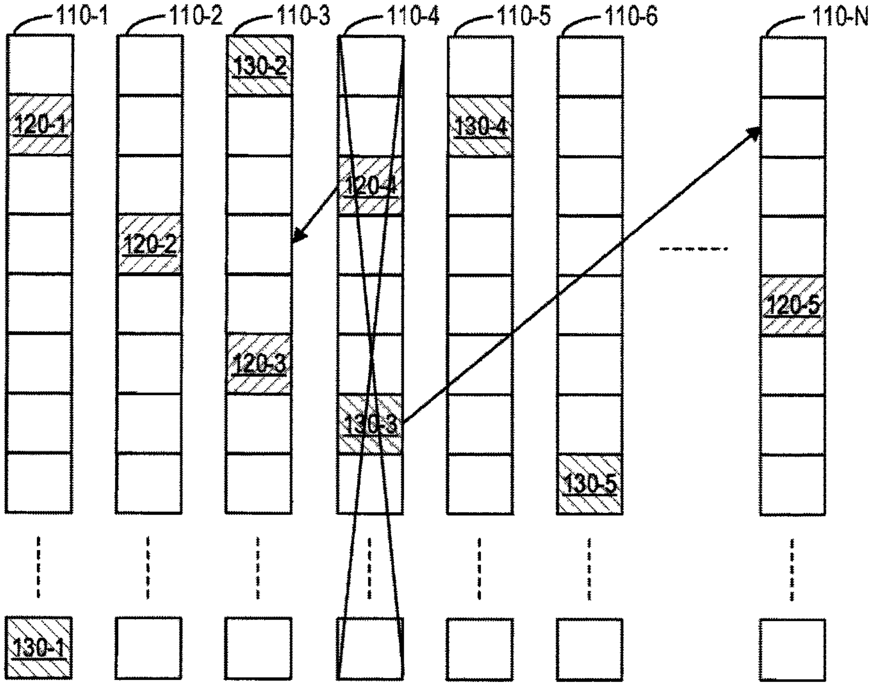
FIG. 2 is a schematic diagram of an example of replacing a storage device in a storage system when the storage device fails.

FIG. 2 illustrates a schematic diagram of replacing a storage device in a storage system when the storage device fails. When a storage device in the storage system fails, blocks in other active storage devices can be used to replace the blocks in the failed storage device. As shown in FIG. 2, when the storage device 110-4 fails, idle blocks in the storage device 110-3 and the storage device 110-N can be used to replace block 120-4 of the logic storage area 120 and block 130-3 of the logic storage area 130. Because blocks in different storage devices are used to replace blocks in the failed storage device, the mapped RAID will no longer be limited by the write input/output bandwidth of a single storage device.

However, to acquire better rebuilding performance, the rebuilding process should involve as many storage devices as possible, so as to read data from and write data into more storage devices. Accordingly, it is expected to distribute the logic storage areas evenly into a plurality of storage devices while creating the mapped RAID. Besides, storage devices of different sizes may be replaced or added into the storage device pool for creating the mapped RAID over time because of sparing or expansion. Therefore, the storage devices of different sizes are expected to co-exist in the storage device pool.

Conventionally, there are two ways to fulfill the above objective. In one way, the storage devices are grouped according to storage device size, and logic storage areas are created on the groups. However, as the storage devices are grouped according to the storage device size, the number of storage devices in the same group is restricted, such that the rebuilding process fails to involve as many storage devices as possible. In the other way, larger storage devices are used as smaller storage devices until the required minimum number of storage devices is achieved. However, this will waste storage space of the larger storage devices. Thus, the above two ways fails to ensure a good storage device utilization rate while distributing the logic storage areas evenly into the storage devices of different sizes in the storage device pool.

Figure 3:
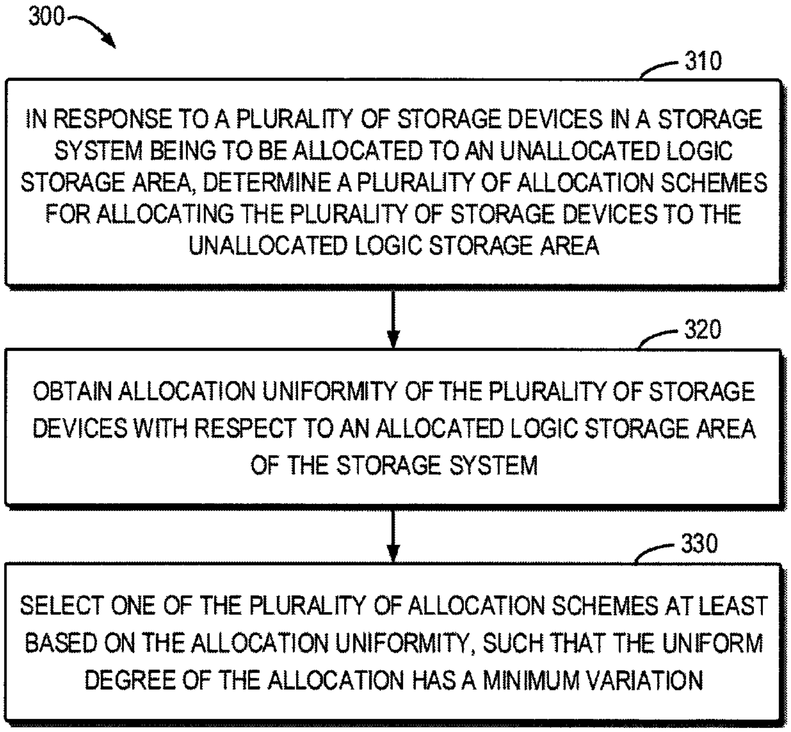
FIG. 3 is a flow chart of a process or method for storage management according to embodiments of the present disclosure.

To at least partially solve the above and other potential problems and defects, embodiments of the present disclosure provide a solution for storage management. FIG. 3 illustrates a flow chart of a process or method 300 for storage management according to embodiments of the present disclosure. In some embodiments, the process 300 can be implemented in the storage system shown in FIGS. 1 and 2 for instance.

At 310, when a plurality of storage devices in a storage system are to be allocated to an unallocated logic storage area, a plurality of allocation schemes for allocating the plurality of storage devices to the unallocated logic storage area are determined. In some embodiments, the unallocated logic storage area can be organized into a predetermined number of blocks. Based on the predetermined number and the number of the plurality of storage devices, a plurality of candidate allocation schemes for allocating the plurality of storage devices to the unallocated logic storage area are generated.

In some embodiments, as the unallocated logic storage area is expected to be distributed into a plurality of storage devices as evenly as possible, M blocks of M different storage devices can be selected from N storage devices to create the logic storage area. As a result, there are $C_N^M$ possible allocation schemes, where N represents the number of the plurality of storage devices in the storage system, and M represents the number of blocks into which the unallocated logic storage area is organized. For example, when the 4D+1P mapped RAID R5 is created on 16 storage devices, there are $C_{16}^5=4368$ possible allocation schemes.

However, when there is the number of the plurality of storage devices in the storage system is large, the number of the obtained allocation schemes is huge. For instance, assuming that the number of the plurality of storage devices is 100, and the unallocated logic storage area is organized into 5 blocks, there are $C_{100}^5=75287520$ possible allocation schemes. If all possible allocation schemes are tried for the unallocated logic storage area, it will be time-consuming and low-efficient.

In some embodiments, a subset of all possible allocation schemes covering the plurality of storage devices can be determined. As long as the subset covers the plurality of storage devices, the subset of all possible allocation schemes can be selected randomly or in any other suitable manners. For example, when the number of the plurality of storage devices is 100 and the unallocated logic storage area is organized into 5 blocks, 3000 allocation schemes can be selected from $C_{100}^5=75287520$ possible allocation schemes, in which the 3000 allocation schemes can cover 100 storage devices.

At 320, allocation uniformity of the plurality of storage devices with respect to an allocated logic storage area of the storage system is obtained. At 330, one of the plurality of allocation schemes is selected at least based on the allocation uniformity, such that the uniform degree of the allocation has a minimum variation.

According to embodiments of the present disclosure, at the time of allocating the plurality of storage devices in the storage system to the unallocated logic storage area, the uniform degree of the allocation has a minimum variation after allocating the unallocated logic storage area, and thus ensuring a good storage device utilization rate while distributing the logic storage area evenly into the storage devices of different sizes in the storage system. The allocation uniformity and the selection of allocation scheme will be further explained with reference to FIG. 4.

Figure 4:
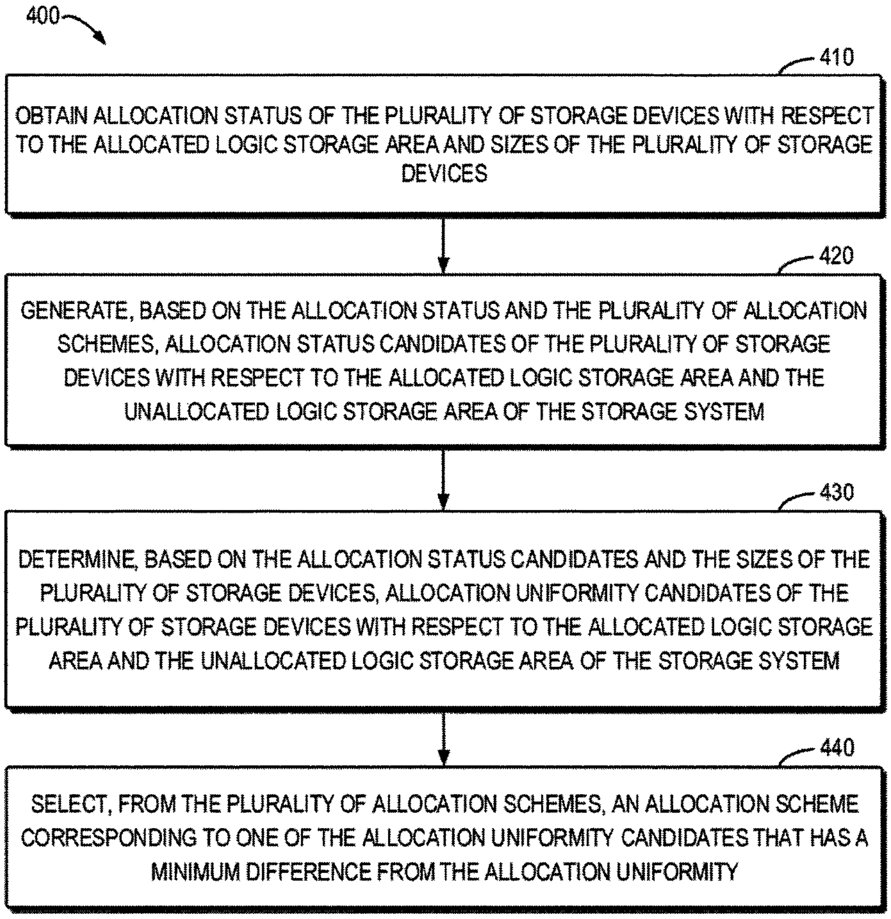
FIG. 4 is a flow chart of a process or method for selecting one of a plurality of allocation schemes according to embodiments of the present disclosure.

FIG. 4 illustrates a flow chart of a process or method 400 for selecting one of a plurality of allocation schemes according to embodiments of the present disclosure. It will be understood that the method 400 can be regarded as an example implementation of block 330 in the above described method 300.

At 410, obtain allocation status of a plurality of storage devices with respect to an allocated logic storage area and sizes of the plurality of storage devices. In some embodiments, the allocation status can be represented as a matrix, in which each element can represent the number of times for allocating blocks in two of the plurality of storage devices to the same allocated logic storage area.

For example, the matrix can be a N*N square matrix, where N represents the number of the plurality of storage devices in the storage system. The matrix can be represented as $V_{i,j}$ and each element in the matrix can be represented as V(i, j). The element V(i, j) represents the number of times for allocating the blocks in the i-th storage device and the j-th storage device to the same allocated logic storage area. In some embodiments, all elements in the matrix $V_{i,j}$ can be initialized to zero. When the plurality of storage devices are allocated to the logic storage area, elements related to the storage devices being allocated to the logic storage area can be counted. For example, if the i-th storage device and the j-th storage device are allocated to the same logic storage area, the value of the element V(i, j) is added with 1. It should be appreciated that the matrix $V_{i,j}$ is a symmetric matrix as the element V(i, j) is equal to the element V(j, i).

At 420, allocation status candidates of the plurality of storage devices with respect to the allocated logic storage area and the unallocated logic storage area of the storage system are generated based on the allocation status and the plurality of allocation schemes. In some embodiments, for one of the plurality of allocation schemes, the element V(i, j) related to the storage devices being allocated to the unallocated logic storage area in the allocation scheme is counted. For example, in the allocation scheme, if the i-th storage device and the j-th storage device are allocated to the unallocated logic storage area, the value of the element V(i, j) in the matrix $V_{i,j}$ of the obtained allocation status is added with 1. Consequently, a plurality of matrices $V'_{i,j}$ of allocation status candidates can be generated for the plurality of allocation schemes.

As described above, each element in the matrix can represent the number of times for allocating blocks in two of the plurality of storage devices to the same allocated logic storage area. For example, referring back to FIG. 1, the storage devices 110-1, 110-2, 110-3, 110-4 and 110-N are allocated to the same logic storage area 120. Therefore, the values of the elements V(1, 2), V(1, 3), V(1, 4), V(1, N), V(2, 1), V(2, 3), V(2, 4), V(2, N), V(3, 1), V(3, 2), V(3, 4), V(3, N), V(N, 1), V(N, 2), V(N, 3), V(N, 4) in the matrix related to these storage devices are added with 1. Because the logic storage areas are expected to be evenly distributed into the plurality of storage devices, the values of the elements in matrix are expected to be closer to each other. As an example, FIGS. 5A-5B show schematic diagrams of non-uniform allocation status and uniform allocation status, respectively.

Figure 5A:
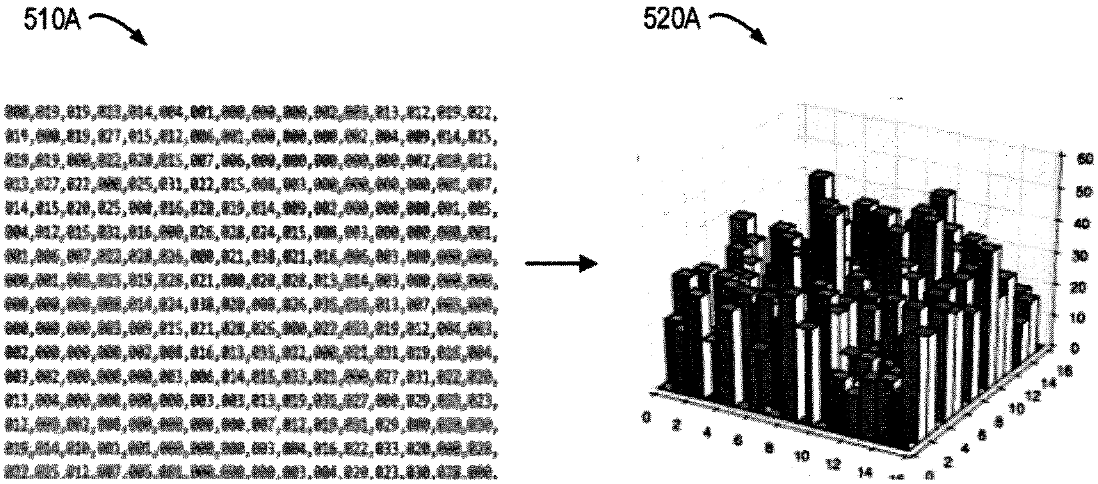
FIGS. 5A-5B respectively show schematic diagrams of non-uniform allocation status and uniform allocation status.
Figure 5B:
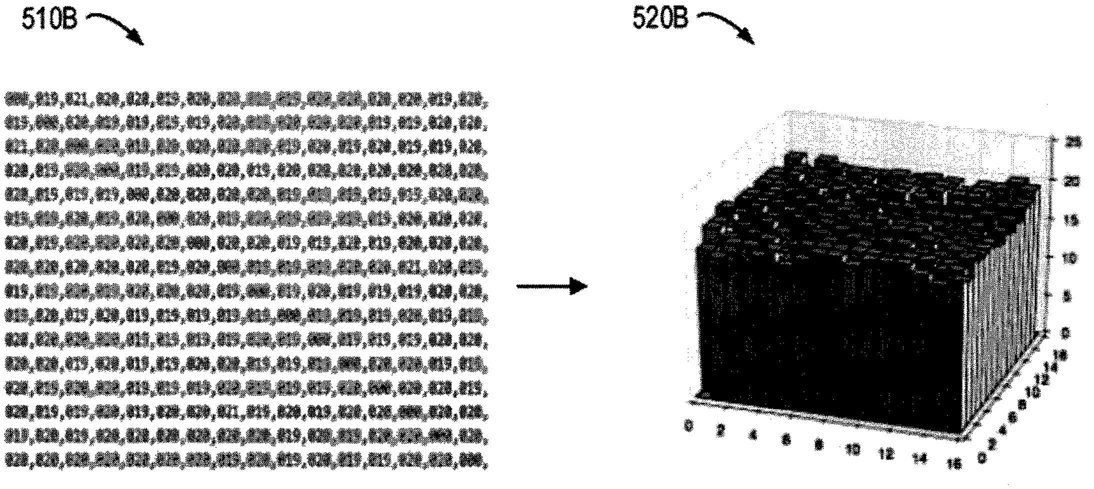

As shown in FIG. 5A, values of elements in matrix 510A of allocation status have significant difference therebetween. What is worse is that values of some elements in matrix 510A are zero, which means storage devices corresponding to these elements are never allocated to a same logic storage area. In this case, if a storage device fails, some storage devices are unable to participate in the rebuilding process. On the contrary, values of elements in matrix 510B of allocation status in FIG. 5B are closer to each other and the values in the elements range from 19 to 21, which means that the plurality of storage devices are allocated to the logic storage areas in a relatively uniform way. Graphs 520A and 520B are visual representations of matrices 510A and 510B. It can be seen that the graph 520B is "flatter" than the graph 520A. The values of the elements in the matrices shown in FIGS. 5A and 5B are only illustrative and any other appropriate values can be used as the values of the elements in the matrix.

When the matrix appears to be "flat," the number of times for allocating the plurality of storage devices to the logic storage areas is similar. However, such allocation takes no account of the size of the storage device, that is, the number of times for allocating the larger storage devices to the logic storage areas is similar to the number of times for allocating the smaller storage devices to the logic storage areas. For a hybrid storage system with storage devices of different sizes, such allocation will waste storage space of a large number of the storage devices. Thus, it is hard to ensure a good storage device utilization rate while distributing the logic storage areas evenly into the storage devices of different sizes in the storage system.

To this end, the allocation scheme is further selected based on allocation uniformity according to embodiments of the present disclosure. In some embodiments, the allocation uniformity can be determined as:

$$U_{i,j}=V_{i,j}*S_{typical}*S_{typical}/(S_i*S_j) \quad (1)$$

where $U_{i,j}$ represents the allocation uniformity, $V_{i,j}$ represents the allocation status, $S_{typical}$ represents a predetermined size of a storage device, $S_i$ and $S_j$ represent sizes of an i-th storage device and a j-th storage device in the plurality of storage devices, respectively, i and j are natural numbers, respectively. In some embodiments, the predetermined size of the storage device $S_{typical}$ can represent a size of a typical storage device in the storage system. For example, it may be the minimum value among the sizes of the storage devices in the storage system or any other suitable storage device size.

In the matrix of the allocation uniformity, the number of times for allocating the larger storage devices and other storage devices to the same logic storage areas is normalized. Therefore, to make the matrix of the allocation uniformity "flatter," the larger storage devices are allocated to more logic storage areas, to avoid waste of storage space of the larger storage devices.

At 430, allocation uniformity candidates of the plurality of storage devices with respect to the allocated logic storage area and the unallocated logic storage area of the storage system are determined based on allocation status candidates and the sizes of the plurality of storage devices. In some embodiments, matrices $U'_{i,j}$ of the allocation uniformity candidates are determined based on the above described matrices $V'_{i,j}$ of the allocation status candidates by Equation (1).

At 440, an allocation scheme corresponding to one of the allocation uniformity candidates that has a minimum difference from the allocation uniformity is selected from the plurality of allocation schemes. In some embodiments, an allocation scheme can be selected, such that a matrix $U'_{i,j}$ of an allocation uniformity candidate corresponding to the allocation scheme has the minimum variance with the matrix $U_{i,j}$ of the allocation uniformity.

According to embodiments of the present disclosure, an optimal allocation scheme that enables the matrix to be "flatter" can be always selected from a plurality of allocation schemes for an unallocated logic storage area, to implement a local optimization solution. In this way, when optimal allocation schemes are selected for all unallocated logic storage area, the final matrix is also expected to be "flat," so as to achieve an approximately global optimization solution. Therefore, it ensures a good storage device utilization rate while distributing the logic storage areas evenly into the storage devices of different sizes in the storage system.

Figure 6:
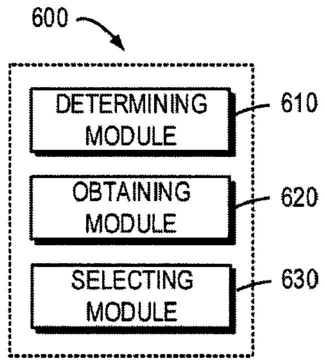
FIG. 6 is a schematic block diagram of an apparatus for storage management according to embodiments of the present disclosure.

FIG. 6 illustrates a schematic block diagram of an apparatus 600 for storage management according to embodiments of the present disclosure. The apparatus 600 can be implemented in the storage system shown in FIGS. 1 and 2, or directly serve as the storage system for instance. As shown, the apparatus 600 comprises a determining module 610, an obtaining module 620 and a selecting module 630.

The determining module 610 is configured to, in response to a plurality of storage devices in a storage system being to be allocated to an unallocated logic storage area, determine a plurality of allocation schemes for allocating the plurality of storage devices to the unallocated logic storage area. The obtaining module 620 is configured to obtain allocation uniformity of the plurality of storage devices with respect to an allocated logic storage area of the storage system. The selecting module 630 is configured to select one of the plurality of allocation schemes at least based on the allocation uniformity, such that the uniform degree of the allocation has a minimum variation.

In some embodiments, the unallocated logic storage area is organized into a predetermined number of blocks. The determining module 610 comprises: a submodule configured to generate, based on the predetermined number and the number of the plurality of storage devices, a plurality of candidate allocation schemes for allocating the plurality of storage devices to the unallocated logic storage area; and a submodule configured to determine, as the plurality of allocation schemes, a subset of the plurality of candidate allocation schemes covering the plurality of storage devices.

In some embodiments, the selection unit 630 comprises: a submodule configured to obtain allocation status of the plurality of storage devices with respect to the allocated logic storage area and sizes of the plurality of storage devices; a submodule configured to generate, based on the allocation status and the plurality of allocation schemes, allocation status candidates of the plurality of storage devices with respect to the allocated logic storage area and the unallocated logic storage area of the storage system; a submodule configured to determine, based on the allocation status candidates and the sizes of the plurality of storage devices, allocation uniformity candidates of the plurality of storage devices with respect to the allocated logic storage area and the unallocated logic storage area of the storage system; a submodule configured to select, from the plurality of allocation schemes, an allocation scheme corresponding to one of the allocation uniformity candidates that has a minimum difference from the allocation uniformity.

In some embodiments, the allocation status is represented as a matrix, each element in the matrix represents the number of times for allocating blocks in two of the plurality of storage devices to the same allocated logic storage area. In some embodiments, the allocation uniformity is determined as: $U_{i,j}=V_{i,j}*S_{typical}*S_{typical}/(S_i*S_j)$, where $U_{i,j}$ represents the allocation uniformity, $V_{i,j}$ represents the allocation status, $S_{typical}$ represents a predetermined size of a storage device, $S_i$ and $S_j$ represent sizes of an i-th storage device and a j-th storage device in the plurality of storage devices, respectively, i and j are natural numbers, respectively.

The modules included in the apparatus 600 can be implemented using various manners, including software, hardware, firmware and any combinations thereof. In one embodiment, one or more modules can be implemented by software and/or firmware, for example, machine-executable instructions stored on the storage medium. Apart from the machine-executable instructions or as an alternative, all or some of the modules in the apparatus 600 can be at least partially implemented by one or more hardware logic components. By way of example, and not limitation, example types of hardware logic components that can be used comprise field programmable gate arrays (FPGAs), application-specific integrated circuits (ASICs), application-specific standard products (ASSPs), system-on-chips (SOPs), complex programmable logic devices (CPLDs) and so on.

Figure 7:
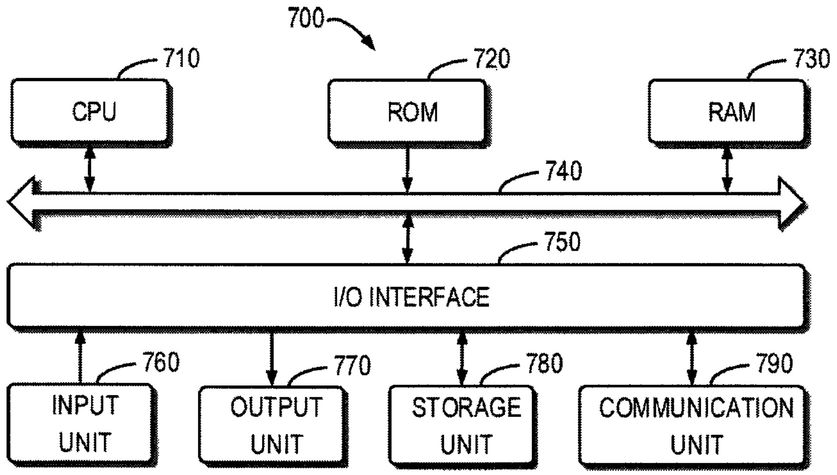
FIG. 7 is a schematic block diagram of a device suitable for implementing embodiments of the present disclosure.

FIG. 7 illustrates a schematic diagram of an electronic device 700 suitable for implementing embodiments of the present disclosure. As shown, the device 700 comprises a central processing unit (CPU) 710, which can perform various suitable actions and processing based on computer program instructions stored in the read-only memory (ROM) 720 or loaded into the random-access memory (RAM) 730 from the storage unit 780. The RAM 730 can also store all kinds of programs and data required by operating the device 700. The CPU 710, the ROM 720 and the RAM 730 are connected to each other via a bus 740. The input/output (I/O) interface 750 is also connected to the bus 740.

A plurality of components in the device 700 are connected to the I/O interface 750, including: an input unit 760, such as a keyboard and a mouse and the like; an output unit 770, such as a display and a loudspeaker of various types and the like; a storage unit 780, such as a magnetic disk and an optical disk and the like; and a communication unit 790, such as a network card, a modem, a radio communication transceiver and the like. The communication unit 790 allows the device 700 to exchange information/data with other devices via computer networks such as Internet, and/or various telecommunication networks.

Each process and processing described above, for example, the process 300 and 400, can be performed by the processing unit 710. For example, in some embodiments, the process 300 and 400 can be implemented as computer software programs tangibly included in the machine-readable medium, for example, the storage unit 780. In some embodiments, the computer program can be partially or fully loaded and/or installed in the device 700 via the ROM 720 and/or the communication unit 790. When the computer program is loaded to the RAM 730 and executed by the CPU 710, one or more steps of the above described process 300 and 400 can be performed. Alternatively, in other embodiments, the CPU 710 can also be configured in any other suitable manners to implement the above process.

Figure 8A:
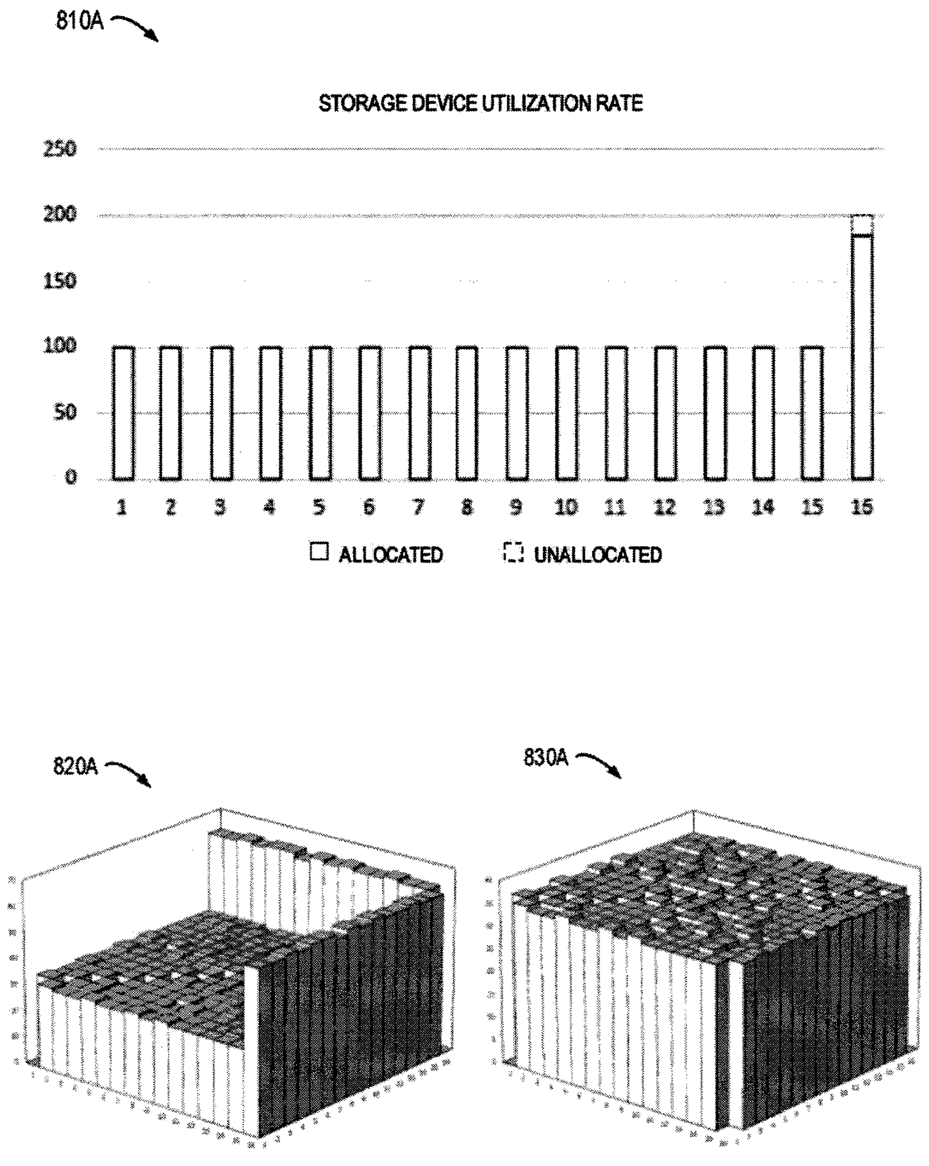
FIGS. 8A-8C respectively show schematic diagrams of a storage device utilization rate, allocation status and allocation uniformity according to embodiments of the present disclosure.
Figure 8B:
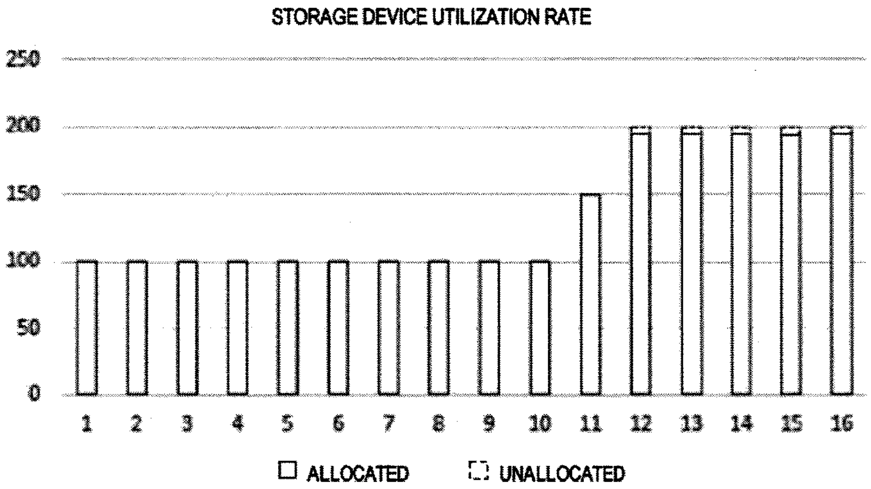
Figure 8B:
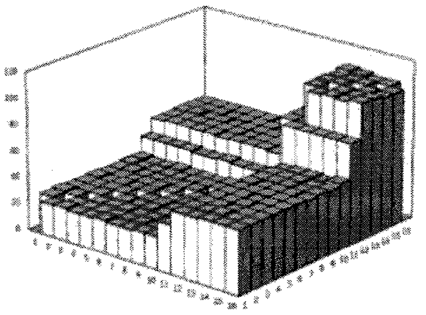
Figure 8B:
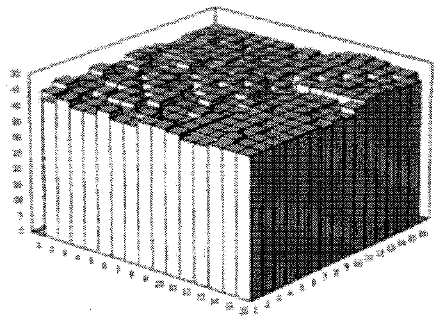
Figure 8C:
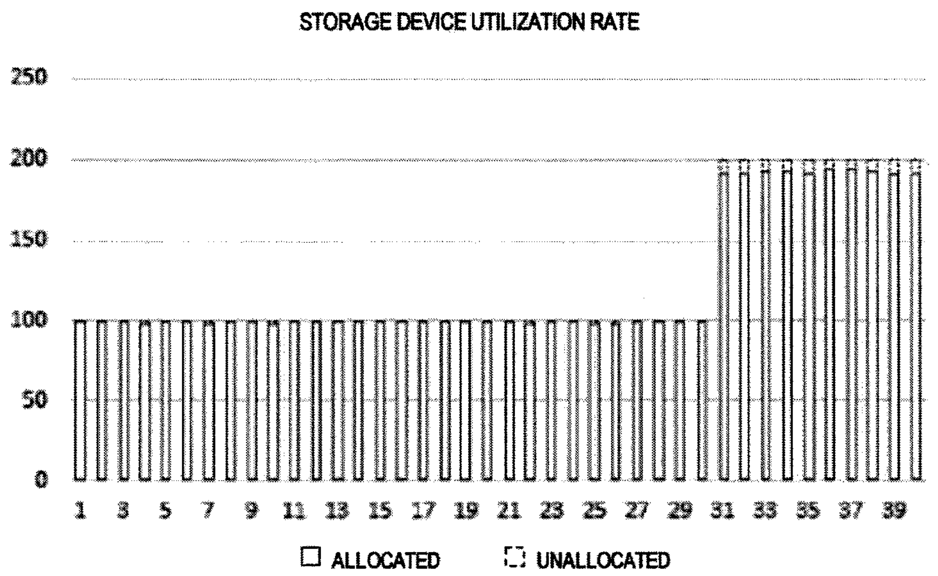
Figure 8C:
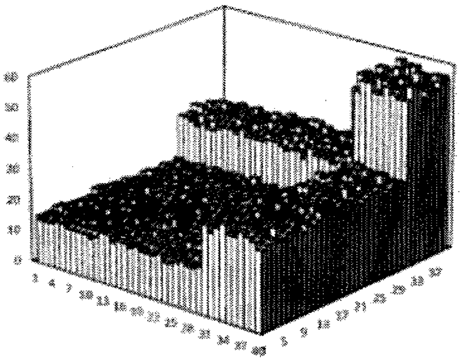
Figure 8C:
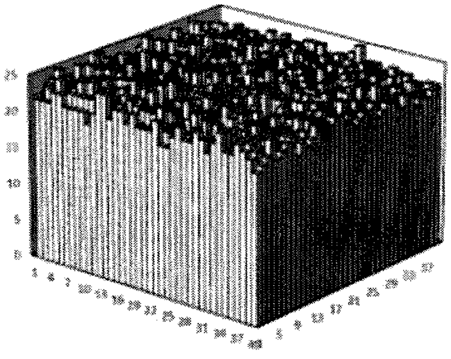

FIGS. 8A-8C respectively illustrate schematic diagrams of storage device utilization rates 810A-810C, allocation status 820A-820C and the allocation uniformity 830A-830C according to embodiments of the present disclosure. In the example of FIG. 8A, there are 16 storage devices, in which 15 storage devices have sizes of 100 logic storage areas and 1 storage device has a size of 200 logic storage areas. Besides, the logic storage area is organized into 6 blocks, including 4 data blocks and 2 parity blocks.

In the example of FIG. 8B, there are 16 storage devices, in which 10 storage devices have sizes of 100 logic storage areas, 1 storage device has a size of 150 logic storage areas, and 5 storage devices have sizes of 200 logic storage areas. Besides, the logic storage area is organized into 6 blocks, including 4 data blocks and 2 parity blocks.

In the example of FIG. 8C, there are 40 storage devices, in which 30 storage devices have sizes of 100 logic storage areas and 10 storage devices have sizes of 200 logic storage areas. Besides, the logic storage area is organized into 8 blocks, including 6 data blocks and 2 parity blocks.

In the above described situation, the storage space of the storage device is barely wasted as shown by the storage device utilization rate 810A-810C, and the logic storage areas are evenly distributed into a plurality of storage device as indicated by the allocation uniformity 830A-830C.

Through the teaching provided in the above description and the accompanying drawings, many modifications and other implementations of the present disclosure will be realized by those skilled in the art. Therefore, it should be appreciated that implementations of the present disclosure are not limited to specific implementations of the present disclosure, and modifications and other implementations are intended to be included within the scope of the present disclosure. Furthermore, although the above description and the accompanying drawings describe the example implementations in the context of some example combinations of the components and/or functions, it should be realized that alternative implementations can provide different combinations of components and/or functions without deviating from the scope of the present disclosure. In this regard, other combinations of components and/or functions different from the above description are also expected to fall within the scope of the present disclosure for instance. Although specific technical terms are employed here, they are used in general and descriptive meanings and bear no intentions of limiting the present disclosure.

We claim:

1. A method for storage management, comprising:

in response to a plurality of storage devices in a storage system being to be allocated to an unallocated logic storage area, determining a plurality of allocation schemes for allocating the plurality of storage devices to the unallocated logic storage area;

obtaining an allocation uniformity of the plurality of storage devices with respect to an allocated logic storage area of the storage system; and selecting one of the plurality of allocation schemes at least based on the allocation uniformity, such that a uniform degree of an allocation has a minimum variation, the selecting of one of the plurality of allocation schemes including:

obtaining an allocation status of the plurality of storage devices with respect to the allocated logic storage area and sizes of the plurality of storage devices;

generating, based on the allocation status and the plurality of allocation schemes, allocation status candidates of the plurality of storage devices with respect to the allocated logic storage area and the unallocated logic storage area of the storage system;

determining, based on the allocation status candidates and the sizes of the plurality of storage devices, allocation uniformity candidates of the plurality of storage devices with respect to the allocated logic storage area and the unallocated logic storage area of the storage system; and selecting, from the plurality of allocation schemes, an allocation scheme corresponding to one of the allocation uniformity candidates that has a minimum difference from the allocation uniformity, the allocation status being represented as a matrix, and each element of the matrix representing a number of times for allocating blocks in two of the plurality of storage devices to the same allocated logic storage area.

2. The method of claim 1, wherein the unallocated logic storage area is organized into a predetermined number of blocks, and the determining a plurality of allocation schemes comprises:

generating, based on the predetermined number and the number of the plurality of storage devices, a plurality of candidate allocation schemes for allocating the plurality of storage devices to the unallocated logic storage area; and determining, as the plurality of allocation schemes, a subset of the plurality of candidate allocation schemes covering the plurality of storage devices.

3. The method of claim 1, wherein the allocation uniformity is determined as:

$$U_{i,j}=V_{i,j}*S_{typical}*S_{typical}/(S_i*S_j),$$

where $U_{i,j}$ represents the allocation uniformity, $V_{i,j}$ represents the allocation status, $S_{typical}$ represents a predetermined size of a storage device, $S_i$ and $S_j$ represent sizes of an i-th storage device and a j-th storage device in the plurality of storage devices, respectively, and i and j are natural numbers, respectively.

4. An electronic device, comprising:

at least one processor, and at least one memory coupled to the at least one processor and storing machine-executable instructions, the instructions, when executed by the at least one processor, cause the device to perform actions comprising:

in response to a plurality of storage devices in a storage system being to be allocated to an unallocated logic storage area, determining a plurality of allocation schemes for allocating the plurality of storage devices to the unallocated logic storage area;

obtaining an allocation uniformity of the plurality of storage devices with respect to an allocated logic storage area of the storage system; and selecting one of the plurality of allocation schemes at least based on the allocation uniformity, such that a uniform degree of an allocation has a minimum variation, the selecting of one of the plurality of allocation schemes including:

obtaining an allocation status of the plurality of storage devices with respect to the allocated logic storage area and sizes of the plurality of storage devices;

generating, based on the allocation status and the plurality of allocation schemes, allocation status candidates of the plurality of storage devices with respect to the allocated logic storage area and the unallocated logic storage area of the storage system;

determining, based on the allocation status candidates and the sizes of the plurality of storage devices, allocation uniformity candidates of the plurality of storage devices with respect to the allocated logic storage area and the unallocated logic storage area of the storage system; and selecting, from the plurality of allocation schemes, an allocation scheme corresponding to one of the allocation uniformity candidates that has a minimum difference from the allocation uniformity, the allocation status being represented as a matrix, and each element of the matrix representing a number of times for allocating blocks in two of the plurality of storage devices to the same allocated logic storage area.

5. The device of claim 4, wherein the unallocated logic storage area is organized into a predetermined number of blocks, and the determining a plurality of allocation schemes comprises:

generating, based on the predetermined number and the number of the plurality of storage devices, a plurality of candidate allocation schemes for allocating the plurality of storage devices to the unallocated logic storage area; and determining, as the plurality of allocation schemes, a subset of the plurality of candidate allocation schemes covering the plurality of storage devices.

6. The device of claim 4, wherein the allocation uniformity is determined as:

$$U_{i,j}=V_{i,j}*S_{typical}*S_{typical}/(S_i*S_j),$$

where $U_{i,j}$ represents the allocation uniformity, $V_{i,j}$ represents the allocation status, $S_{typical}$ represents a predetermined size of a storage device, $S_i$ and $S_j$ represent sizes of an i-th storage device and a j-th storage device in the plurality of storage devices, respectively, and i and j are natural numbers, respectively.

7. A computer program product tangibly stored on a non-transient computer-readable medium and including machine-executable instructions, the machine-executable instructions, when executed, cause a machine to:

in response to a plurality of storage devices in a storage system being to be allocated to an unallocated logic storage area, determine a plurality of allocation schemes for allocating the plurality of storage devices to the unallocated logic storage area;

obtain an allocation uniformity of the plurality of storage devices with respect to an allocated logic storage area of the storage system; and select one of the plurality of allocation schemes at least based on the allocation uniformity, such that a uniform degree of an allocation has a minimum variation, wherein the machine-executable instructions, when executed, cause the machine to:

obtain an allocation status of the plurality of storage devices with respect to the allocated logic storage area and sizes of the plurality of storage devices;

generate, based on the allocation status and the plurality of allocation schemes, allocation status candidates of the plurality of storage devices with respect to the allocated logic storage area and the unallocated logic storage area of the storage system;

determine, based on the allocation status candidates and the sizes of the plurality of storage devices, allocation uniformity candidates of the plurality of storage devices with respect to the allocated logic storage area and the unallocated logic storage area of the storage system; and select, from the plurality of allocation schemes, an allocation scheme corresponding to one of the allocation uniformity candidates that has a minimum difference from the allocation uniformity, wherein the allocation status is represented as a matrix, and wherein each element of the matrix represents a number of times for allocating blocks in two of the plurality of storage devices to the same allocated logic storage area.

8. The computer program product of claim 7, wherein the unallocated logic storage area is organized into a predetermined number of blocks, and the machine-executable instructions, when executed, cause the machine to:

generate, based on the predetermined number and the number of the plurality of storage devices, a plurality of candidate allocation schemes for allocating the plurality of storage devices to the unallocated logic storage area; and determine, as the plurality of allocation schemes, a subset of the plurality of candidate allocation schemes covering the plurality of storage devices.

9. The computer program product of claim 7, wherein the allocation uniformity is determined as:

$$U_{i,j}=V_{i,j}*S_{typical}*S_{typical}/(S_i*S_j),$$

where $U_{i,j}$ represents the allocation uniformity, $V_{i,j}$ represents the allocation status, $S_{typical}$ represents a predetermined size of a storage device, $S_i$ and $S_j$ represent sizes of an i-th storage device and a j-th storage device in the plurality of storage devices, respectively, and i and j are natural numbers, respectively.

* * * * *